Feb. 12, 1935.  R. CHILTON  1,990,979
ENGINE COOLING MEANS
Filed July 14, 1933
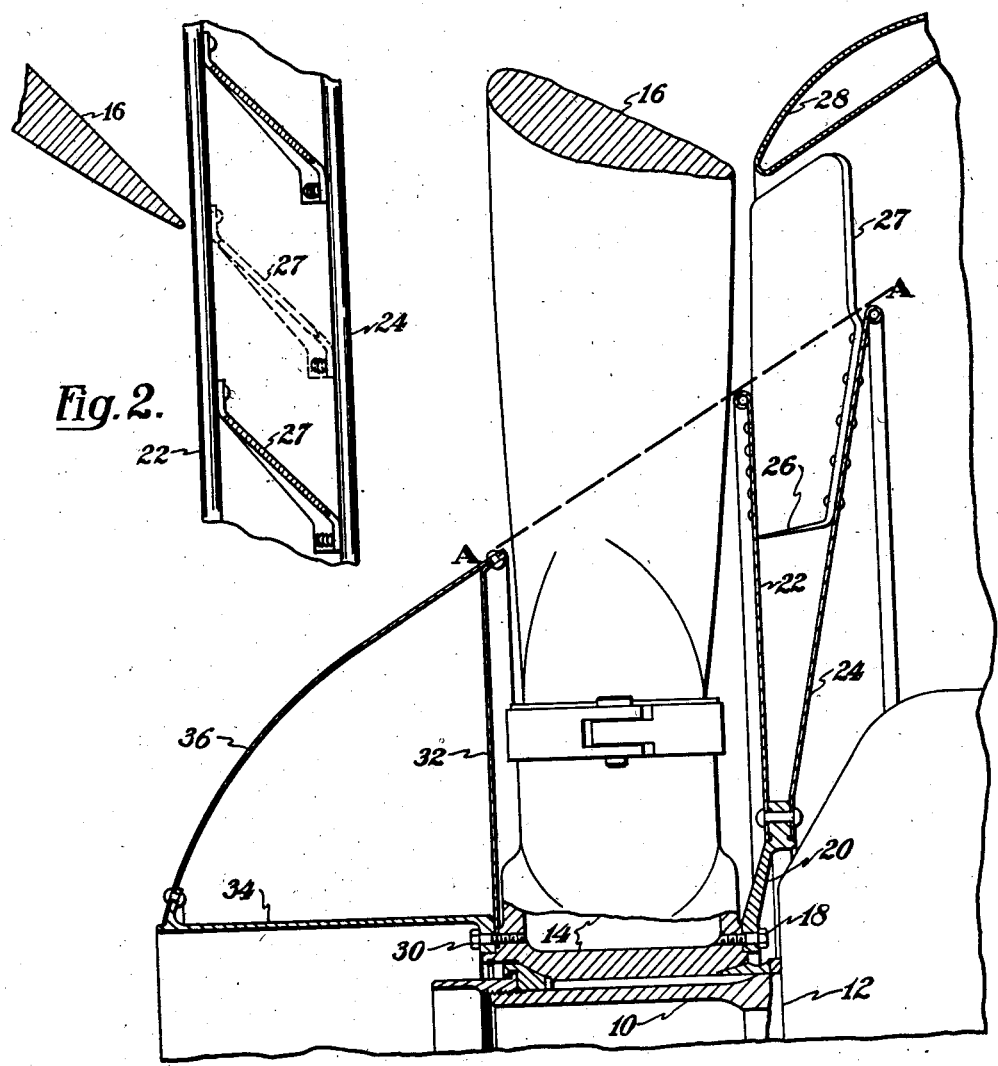
Fig. 2.
Fig. 1.
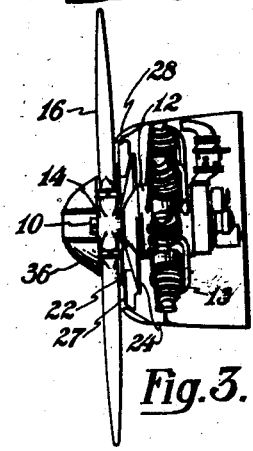
Fig. 3.
INVENTOR
ROLAND CHILTON
BY
ATTORNEY Patented Feb. 12, 1935

1,990,979

UNITED STATES PATENT OFFICE 1,990,979

ENGINE COOLING MEANS

Roland Chilton, Ridgewood, N. J., assignor to Wright Aeronautical Corporation, a corporation of New York Application July 14, 1933, Serial No. 680,343

16 Claims. (Cl. 244—31)

This invention relates to aircraft engines, and more particularly to improvements in means for cooling radial air cooled engines.

Generally, my invention is adapted for use with an air cooled radial aircraft engine around which is provided a ring cowl, the forward or leading edge of the cowl being located fairly close to the path of travel of the propeller, the latter being directly carried on the engine shaft. To the rearward face of the propeller hub, a pair of disks are attached, these disks at their outer edges, defining an annular air entrance opening with the cowl ring. Fan blades, pitched to substantially the same degree as the propeller blades, are carried by the disks and extend across the annular cowl entrance opening. At the front of the propeller, a spinner is mounted for external air flow thereover, the spinner having a substantially streamline or conical shape wherein an extension of a conical element thereof passes adjacent the edges of the fan blade holding disks. The space occupied by the propeller between the disks and the base of the spinner, may be uncowled, and provides a dead air cavity occupied in part by the blade roots, whose utility as a fan is negligible. The propeller blade portions extending beyond the spinner and within the compass of the ring cowl are normally adequately pitched to form part of the blower for forcing air through the annular cowl opening, and are complemented by the fan blade in forming an efficient cooling air blower for driving air past the engine cylinders. The size of the annular opening may be proportioned to a desirable area with respect to the area between the engine cylinders and cylinder baffling, thereby attaining efficient cooling air flow, and enabling the fan blades to be pitched to such a degree as to give high efficiency under the air velocity conditions in which they operate. In order to gain a clearer understanding of the problems solved by the invention, a brief résumé will be given of the previous methods of cooling and the problems involved therein.

Originally, relatively low powered engines, wherein the air cooled cylinders projected radially from the engine casing, were cooled by the air blast caused by the flight speed of the aircraft, slightly augmented by the additional air blast caused by the propeller. As development of aircraft and engines has proceeded, the tendency has been toward engines of greatly increased horse power, along with reduction in overall diameter of the radially projecting engine cylinders. Concurrently, to reduce the parasite drag induced by the radially projecting cylinders, ring cowling has been devised to completely enclose the projecting ends of the cylinders, whereby the air flow over the engine and aircraft is improved. With higher powered engines, these aerodynamic improvements have caused reductions in the amount of cooling air available, and have made necessary the development of devices for efficiently utilizing the available cooling air from the aircraft slipstream to properly cool the high powered cylinders. Thus, inter-cylinder baffling has been resorted to which guides the cooling air over the finned surfaces of the cylinders, whereby such cooling air reaches all parts of the engine to be cooled. This baffling causes a reduction in area of the space through which cooling air may flow, and when used in conjunction with ring cowling, builds up a barrier to the passage of air whereby the natural air speed due to the flight of the aircraft is insufficient to supply enough air to cause proper cooling.

A concurrent difficulty occasioned by these design trends arises through the fact that the reduced overall engine diameter approaches the central region of the propeller which, for structural reasons, has little or no propulsive or blowing effect. The propeller blade roots and hub must necessarily be thickened in section to provide adequate strength in the propeller, and likewise, the pitch of the propeller blades gradually increases toward the root so that now, that portion of the propeller in front of the engine and ring cowling, tends to mask the entrance opening to the ring cowling to prevent adequate air flow therethrough. In addition, the inner part of the propeller tends to act as a centrifuge, urging the air which approaches this portion of the propeller radially outward rather than axially of the propeller shaft. Hence, a considerable portion of the air which would otherwise reach the engine for cooling is diverted outwardly around the ring cowl.

An additional detrimental effect inheres, since the restricted air passages between the cylinders tend to reduce potential air velocity through the air entrance opening of the ring cowl, whereby the pitched portions of the propeller blades which might otherwise have a beneficial blowing effect, are not properly pitched to form an efficient blower under the air velocity conditions which are encountered.

Prior devices have been evolved in an attempt to correct some or all of the conditions above enumerated but, while they may assist in correcting certain phases of the problem, structural or mechanical difficulties result, whose disadvantages offset their advantages.

For instance, some designs have provided a large hollow spinner rotatable with the propeller and having an axial air inlet opening, such opening having an area properly proportioned with respect to the cooling passages around the engine, so that the cooling air velocity will be adequate. Although such structures have been satisfactory from a cooling standpoint, the large diameter spinner produces structural difficulties, particularly from the standpoint of centrifugal stresses induced therein. Other prior designs have utilized fans within hollow spinners, and additional cooling fans geared to turn at rotative speeds divergent from that of the propeller. The latter class of device involves mechanical complications and additional weight.

An object of this invention is to provide means for adequately cooling a cowled radial air cooled engine.

Another object is to provide such cooling means in the form of a blower fan rotatable with the propeller and adapted to act on the air stream to augment the cooling air velocity over the engine.

Another object is to provide an annular air entrance opening at the forward end of a ring cowl, of such a nature that air passing therethrough will adequately cool the engine cylinders.

Another object is to provide a relatively small diameter spinner forwardly of a propeller, in combination with an annular air entrance opening in a ring cowl, and in combination with a suitable blower in said annular opening, whereby a highly efficient cooling system is attained.

A further object is to provide a cooling air blower rotatable with the propeller, organized so that the blades thereof may be pitched at substantially the same angle as the propeller blades and may act in an efficient manner on the air stream. By such efficient action, a maximum of cooling air flow is attained with a minimum of complication and with rotative parts of the cooling system having minimum weight and small diameter whereby the centrifugal stresses imposed thereon by their rotation, are small.

A still further object is to provide a structure which may be easily assembled and disassembled from the propeller, and in which the several parts are separable.

A still further object is to provide a structure which eliminates divided or pierced members in the vicinity of the propeller which would tend to set up centrifugal stresses in the structure, which are difficult to compensate.

For a better understanding of the details of my invention, reference may be made to the drawing in which similar numbers indicate similar parts, and in which:

Fig. 1 is a fragmentary axial section through the engine shaft, propeller, and the cooling devices of the invention;

Fig. 2 is a fragmentary sectional plan on the line A—A of Fig. 1, illustrating the relationship of the fan blades to the propeller; and Fig. 3 is a reduced scale sectional diagram in elevation showing the relationship of the cooling device to the engine and cylinders.

In the figures, a crankshaft 10 extends forwardly from an engine casing 12 on which are mounted conventional cylinders 13. The shaft 10 carries a conventional propeller hub 14 equipped with propeller blades 16.

Secured to the back of the hub 14 as by bolts 18, is a flange 20 to which are secured a front disk 22 and a rear cone disk 24, between which are secured base portions 26 of blades 27 which extend across the annular opening defined between the outer diameters of the disks 22 and 24 and the entrance diameter of a fixed cowl 28. Secured to the front of the hub 14 by bolts 30, is a nose spinner comprising a back plate 32 and a tubular member 34 to which is riveted a continuous conical or streamlined shell 36.

The area of the annular opening, in which the fan blades 27 are located, is proportioned to the area for flow past the engine cylinders, so that the air velocity through this opening will correspond to the normal propeller slipstream velocity of the air passing outside the cowl. The blades 27 are then pitched to substantially the same angle as found most efficient for the propeller blades 16 and a relatively large number of blades 27 are used. A desirable relationship is one in which the gap between adjacent blades is of the same order as the chord of the blades. In this case it may be desirable to make the fan blades an even multiple of the number of propeller blades and to omit those fan blades which would fall directly behind a propeller blade, since these particular blades may be redundant and might constitute a discontinuous angle in the case where the main propeller blades are adjustable.

Attention is called to the fact that the diameters of the plates 22 and 24 are such that their circumferences align with the contour of the front spinner 36, as indicated by the dotted line A—A, so that the envelope of the structure is of conical streamline form. I prefer also to make the entrance portion of the fixed cowl 28 of corresponding conicity.

In the preferred embodiment, the intervals between the rims of the back plate 32 of the front spinner, and the front plate 22 of the fan member, and the space between the disks 22 and 24, have been shown as open. While these spaces may be covered by suitable cowls or closures, yet these would represent discontinuous rings which are difficult to support against the centrifugal forces. The function of such rings would be to avoid radial circulation of the air, which in this case is prevented by the fact that the intervals between the disks 32, 22 and 24 comprise dead spaces which are closed, except at the periphery, whereby radial circulation is prevented.

It will be seen that the structure of this invention meets the objectives set forth in a relatively small diameter structure, which is, accordingly, relatively light, and that the centrifugal loads have been substantially reduced compared to a spinner which is made large enough for internal flow. It will also be seen that the centrifugal loads are carried on continuous disk members and that interrupted circumferential members have been avoided without introducing radial air flow.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The combination with an engine having a propeller and a ring cowl, of a disk secured to the back of the propeller and defining an entrance annulus to the ring cowl and fan blades secured to said disk and extending across said entrance.

2. The combination with an engine having a propeller and a ring cowl, of a disk secured to the back of the propeller and defining an entrance annulus to the ring cowl and fan blades secured to said disk and extending across said entrance, and a spinner secured to the front of the propeller and comprising a streamline form having said disk as its base.

3. The combination with an engine having a propeller and a ring cowl, of a conical spinner secured to the front of the propeller, a fan plate secured to the back of the propeller and defining an entrance annulus to said ring cowl and fan blades secured to said fan plate and extending across said annulus.

4. The combination with an engine having a propeller and a ring cowl, of a conical spinner secured to the front of the propeller, a fan plate secured to the back of the propeller and defining an entrance annulus to said ring cowl and fan blades secured to said fan plate and extending across said annulus, said fan blades having substantially the same pitch as the propeller.

5. A cooling and cowling means for an engine having a propeller including, in combination, a spinner carried by said propeller and over the exterior surface of which air is adapted to flow, a plurality of blower vanes carried by said propeller and extending radially beyond the defining form of said spinner, and a fixed ring cowl embracing said engine and embracing said blower vanes, said ring cowl being adapted to receive air passing over said spinner and delivered by said vanes and having its forward edge overlapping said vanes.

6. In an airplane having an engine to be cooled, a propeller for said engine, a ring cowl embracing said engine having its forward edge between said propeller and said engine, a spinner carried by said propeller having a diameter of an extension of its streamline form, in the plane of said cowl, substantially less than said cowl whereby an annular opening is defined, and means other than said propeller, extending across said annular opening and embraced by said ring cowl for causing cooling air to enter said ring cowl for cooling said engine.

7. In an airplane having an engine to be cooled, a propeller for said engine, a ring cowl embracing said engine having its forward edge between said propeller and said engine, a spinner carried by said propeller having a diameter of an extension of its streamline form, in the plane of said cowl, substantially less than said cowl whereby an annular opening is defined, and means comprising a plurality of pitched fan blades extending substantially radially across said annular opening and embraced by said ring cowl for forcing air passing over said spinner to enter within said cowling.

8. The combination with an engine having a ring cowl and a propeller driven thereby, of a disk attached to the rearward face of the hub of said propeller, the edge of said disk lying in inwardly spaced relation to said ring cowl to provide an annular air inlet, pitched blower vanes carried by said disk and extending across said annular air inlet, and a streamlined spinner fixed to the forward face of said propeller hub, said spinner having a contour such that an extension of an element thereof substantially intersects the edge of said disk.

9. A spinner for an aircraft propeller comprising a cylindrical member projecting forwardly from the propeller hub, a disc extending radially out from said hub, and a streamlined spinner attached at its forward end to the forward edge of said cylindrical member and at its rearward end to the periphery of said disc.

10. In combination with a radial engine having a fixed ring cowl and a propeller, a streamlined spinner on the propeller hub, ahead of the propeller, and a circular support rearward of the propeller and carried thereby, said support having a diameter substantially equal to the diameter of said spinner form when rearwardly extended to the plane of said support, said support periphery lying under the leading edge of said cowl ring, whereby an annular air entrance opening is formed for said cowling.

11. In combination with a radial engine having a fixed ring cowl and a propeller, a streamlined spinner on the propeller hub, ahead of the propeller, a circular support rearward of the propeller and carried thereby, said support having a diameter substantially equal to the diameter of said spinner form when rearwardly extended to the plane of said support, said support periphery lying under the leading edge of said cowl ring, whereby an annular air entrance opening is formed for said cowling, and blower vanes carried by said support and bridging said annular opening.

12. The combination with a radial cylinder engine having a propeller and a ring cowl encircling the outer cylinder ends, of means for defining a relatively narrow annular air entrance opening beneath the leading edge of said ring cowl, and fan blades driven by said engine and extending across said annular air entrance opening.

13. The combination with a radial cylinder engine having a propeller and a ring cowl encircling the outer cylinder ends, of means for defining a relatively narrow annular air entrance opening beneath the leading edge of said ring cowl, fan blades driven by said engine and extending across said annular air entrance opening, and a substantially conical spinner carried by said propeller, the defining form thereof having said means as its base.

14. The combination with a radial cylinder engine having a propeller, of means for enclosing said engine, means for defining with said first named means a relatively narrow annular air entrance opening to said engine cylinders, said opening being between the propeller and the engine, and fan blades driven by said engine and extending across said opening for forcing engine cooling air therethrough.

15. The combination with a radial cylinder engine having a propeller, of means comprising disks forward of and rearward of the propeller blades for masking the blade roots to provide a relatively dead air space therefor during engine operation, said disks extending radially to relatively efficient stations in the propeller blades, and a streamline spinner forward of said propeller having a continuation of its profile intersecting the outer edges of said disks.

16. The combination with a radial cylinder engine having a propeller, of means comprising disks forward of and rearward of the propeller blades for masking the blade roots to provide a relatively dead air space therefor during engine operation, said disks extending radially to relatively efficient stations in the propeller blades, a streamline spinner forward of said propeller having a continuation of its profile intersecting the outer edges of said disks, and means carried by said rearward disk for augmenting cooling air flow over the outer cylinder ends.

ROLAND CHILTON.